US012168542B2

(12) United States Patent
Alcázar Homs

(10) Patent No.: US 12,168,542 B2
(45) Date of Patent: Dec. 17, 2024

(54) MACHINE AND METHOD FOR LABELLING A STACK OF ELEMENTS

(71) Applicant: AL-GAR PROJECTS, S.L., Cardedeu (ES)

(72) Inventor: Silvia Alcázar Homs, Cardedeu (ES)

(73) Assignee: AL-GAR PROJECTS, S.L., Ardedeu (ES)

( * ) Notice: Subject to any disclaimer, the term of this patent is extended or adjusted under 35 U.S.C. 154(b) by 0 days.

(21) Appl. No.: 18/700,463

(22) PCT Filed: Oct. 11, 2022

(86) PCT No.: PCT/ES2022/070642
§ 371 (c)(1),
(2) Date: Apr. 11, 2024

(87) PCT Pub. No.: WO2023/062262
PCT Pub. Date: Apr. 20, 2023

(65) Prior Publication Data

US 2024/0336389 A1 Oct. 10, 2024

(30) Foreign Application Priority Data

Oct. 11, 2021 (ES) .................................. 202130953

(51) Int. Cl.
*B65C 9/46* (2006.01)
*B41J 3/407* (2006.01)
(Continued)

(52) U.S. Cl.
CPC ............... *B65C 9/46* (2013.01); *B41J 3/4075* (2013.01); *B41J 13/08* (2013.01); *B41J 25/304* (2013.01);
(Continued)

(58) Field of Classification Search
CPC .... B65C 9/46; B65C 9/06; B65C 9/26; B65H 3/322; B65H 2301/4228; B41J 3/4075; B41J 13/08; B41J 25/304
See application file for complete search history.

(56) References Cited

FOREIGN PATENT DOCUMENTS

| | | |
|---|---|---|
| EP | 1247774 A1 | 10/2002 |
| JP | H10211917 A | 8/1998 |

OTHER PUBLICATIONS

International Search Report in related patent application PCT/ES2022/070642 prepared by the European Patent Office and having a mailing date of Apr. 25, 2023, 4 pgs., English version provided.

(Continued)

*Primary Examiner* — Sonya M Sengupta
(74) *Attorney, Agent, or Firm* — Hassan Abbas Shakir; Shakir Law PLLC

(57) ABSTRACT

A labelling machine for labelling a stack of elements is intended for the automated placement of a label located between elements forming part of the stack, and includes a support structure; printing means configured for printing a label to be placed on a stack of elements; a head supported on the support structure, the head being provided with printing means, the head being movable and adjustable at least in height through guiding means and motorized means; and separation means intended for separating two elements superimposed on one another forming part of the stack, such that they vertically separate an element to be handled, generating a free space between the two elements intended for the arrangement of the label.

16 Claims, 12 Drawing Sheets

(51) Int. Cl.

| | |
|---|---|
| ***B41J 13/08*** | (2006.01) |
| ***B41J 25/304*** | (2006.01) |
| ***B65C 9/06*** | (2006.01) |
| ***B65C 9/26*** | (2006.01) |
| ***B65H 3/32*** | (2006.01) |

(52) U.S. Cl.

CPC .................. *B65C 9/06* (2013.01); *B65C 9/26* (2013.01); *B65H 3/322* (2013.01); *B65H 2301/4228* (2013.01)

(56) References Cited

OTHER PUBLICATIONS

Written Opinion of the International Searching Authority in related patent application PCT/ES2022/070642 prepared by the European Patent Office and having a mailing date of Apr. 25, 2023, 5 pgs., English version provided.

MACHINE AND METHOD FOR LABELLING A STACK OF ELEMENTS

CROSS-REFERENCE TO RELATED APPLICATIONS

This application is a national stage under 35 U.S.C. § 371 of PCT patent application PCT/ES2022/070642 filed on 11 Oct. 2022, which is pending and which is hereby incorporated by reference in its entirety for all purposes. PCT/ES2022/070642 claims priority to Spanish Patent Application P202130953 filed on 11 Oct. 2021, which is hereby incorporated by reference in its entirety for all purposes.

OBJECT OF THE INVENTION

The invention is directed to a machine for labelling a stack of items, being intended for the placement of a label located between elements, as well as a method for labelling a stack of elements to be handled.

More specifically, the invention is directed to a machine, as well as a method for the fully automatic labelling of a stack of elements to be handled such as, for example, cardboard sheets commonly used for forming boxes or packaging, group of laminar elements, cardboard boxes, packages or the like in order to have adequate traceability.

BACKGROUND OF THE INVENTION

In the packaging sector, those installations intended for manufacturing and forming cardboard sheets to be used subsequently in the formation of boxes, for example, are well known. During the production process, said sheets are grouped into vertical stacks for subsequent storage or for performing other subsequent phases.

In order to be able to trace each of the stacks, for example, information relating to an order number, customer name, sheet dimensions, etc., is placed on a label with a series of production data, the placement of which is performed manually by operators. However, this operation requires the use of at least one dedicated operator, which also means that errors may occur during placement of the label or that the label may even be placed in such a way that it may detach from the stack, thus losing information relating to a stack.

Document JP H10211917, which describes a machine for placing labels on a stack of sheets, the common features of which are described in the preamble of claim 1, is known in the state of the art. However, this machine comprises means for moving the sheets that are more difficult to assemble and furthermore involves a longer operating time for placing the label between two sheets of a stack. This problem is solved by means of the machine of the present invention.

Furthermore, the applicant is currently unaware of an invention that has all the features described in this specification.

DESCRIPTION OF THE INVENTION

The present invention has been developed with the aim of providing a labelling machine which is configured as a novelty within the field of application and solves the previously drawbacks, also contributing other additional advantages that will be obvious from the description below.

In this specification, the element to be handled is understood to mean a laminar element, a group of laminar elements, a box or package.

Therefore, an object of the present invention is to provide a labelling machine for labelling a stack of elements to be handled, for example, laminar elements, which is essentially characterised in that it comprises:

- a support structure;
- printing means configured for printing a label to be placed on a stack;
  - a head supported on the support structure, the head being provided with the printing means, the head being movable and adjustable in height through guiding means and motorised means;
  - separation means intended for separating two elements superimposed on one another forming part of the stack, such that they vertically separate an element, generating a free space between the two elements such that it allows the arrangement of the label coming from the printing means; and
  - abutment means located in the head intended for making contact with a stack of laminar elements and preventing unwanted displacement of the stack of laminar elements during placement of the printed label.

Preferably, the support structure comprises a gantry provided with secondary abutment means intended for making contact with a stack of elements.

In the embodiments of the invention, the secondary abutment means comprise a movable column with a flat surface intended for coming into contact with the stack of laminar elements, the movable column being capable of sliding axially along a horizontal cross member of the gantry structure.

According to the invention, the printing means may comprise a printer and a printed paper feeding ramp oriented towards the stack.

Advantageously, the aforementioned feeding ramp can be inclined with respect to a horizontal plane or ground plane.

According to another feature of the invention, the separation means comprise at least one retractable blade, such that it is movable from a first retracted position to a second extended position in which said at least one blade is introduced into the stack.

Additionally, the secondary abutment means include sensor means intended for detecting parameters related to the movement of such secondary abutment means along the support structure such as, for example, speed and positioning with respect to a reference point.

Preferably, the abutment means located in the head comprise a pneumatic cylinder located in an inclined plane, the pneumatic cylinder being coupled to an abutting platen with a surface oriented in a vertical plane.

Advantageously, the abutting platen has a recess intended for the passage of the separation means.

In a preferred embodiment, the separation means may comprise at least one axially movable blade (preferably two parallel blades separated from one another) linked to motor means, said at least one blade being assembled on a structure horizontally movable by means of guiding means present in the head.

In addition, the machine may comprise an interface (such as, for example, a touch screen, pushbuttons) between a control unit which regulates and acts on all the motor means present in the machine, the printer, as well as other means and electronic components for the correct operation of the machine and the operator.

Preferably, the head has a platform assembled on a frame movable by means of motor means, which includes the guiding means forming part of the separation means and the printing means.

Additionally, it is possible that the support structure includes guiding means for moving the head in a forward and backward movement direction in a horizontal plane.

Advantageously, the head includes sensor means intended for calculating the speed of movement in the horizontal plane.

As a result of these features, the label placement method can be automated without having to employ an operator to perform such operations, and at the same time without damaging the laminar elements during handling. This machine allows the printed label to be deposited such that it is sandwiched between two laminar elements and a second folded portion is arranged externally such that it is visible, so that the label is held by the pressure exerted by the laminar elements arranged above it. Therefore, the machine can use labels with or without an adhesive portion, without having to carry out any modification on the machine.

Another object of the invention is to provide a method for labelling a stack of elements to be handled, using a labelling machine as described above, characterised in that the execution of labelling on a stack of elements to be handled involves the following steps:

- separating two elements which are superimposed on one another, such that they define a space between both two elements;
- deploying the separation means in a forward movement direction in a horizontal movement;
- printing a label using the printing means, such that the printed label is partially inserted into the space existing between the two separated elements; and
- retracting the separation means in a backward movement direction to its standby position.

According to another aspect of the method of the invention, the label exits the printing means in printed form towards the stack of elements to be handled in an inclined plane with respect to a horizontal plane.

In a preferred embodiment, the label can exit the printing means in printed form towards the stack in an inclined plane with respect to the horizontal plane.

Thus, the labelling machine described represents an innovative structure with structural and constituent features heretofore unknown for its intended purpose, reasons which, taken together with its usefulness, provide it with sufficient grounds for obtaining the requested exclusivity privilege.

Other features and advantages of the labelling machine object of the present invention will become apparent from the description of a preferred but not exclusive embodiment illustrated by way of non-limiting example in the attached drawings, in which:

DESCRIPTION OF A PREFERRED EMBODIMENT

In light of the aforementioned figures, and in accordance with the adopted numbering, one may observe therein a preferred exemplary embodiment of the invention, which comprises the parts and elements indicated and described in detail below.

Moreover, the terms first, second, third, and the like in the description and in the claims are used to distinguish between similar elements and not necessarily to describe a sequential or chronological order. The terms may be interchanged under appropriate circumstances and the embodiments of the invention may operate in sequences other than those described or illustrated herein.

Moreover, the terms top, bottom, upper, lower, and the like in the description and in the claims are used for descriptive purposes and not necessarily to describe relative positions.

In a preferred embodiment, the labelling machine, generally indicated with the reference (1), is particularly intended for the placement of a label (with or without an adhesive portion) at a height of a stack of laminar elements (or also referred to herein as sheets) superimposed on one another and made, for example, of cardboard, comprising a support structure (2) comprising a gantry supporting a head (6) which will be described in greater detail below.

Figure 1:
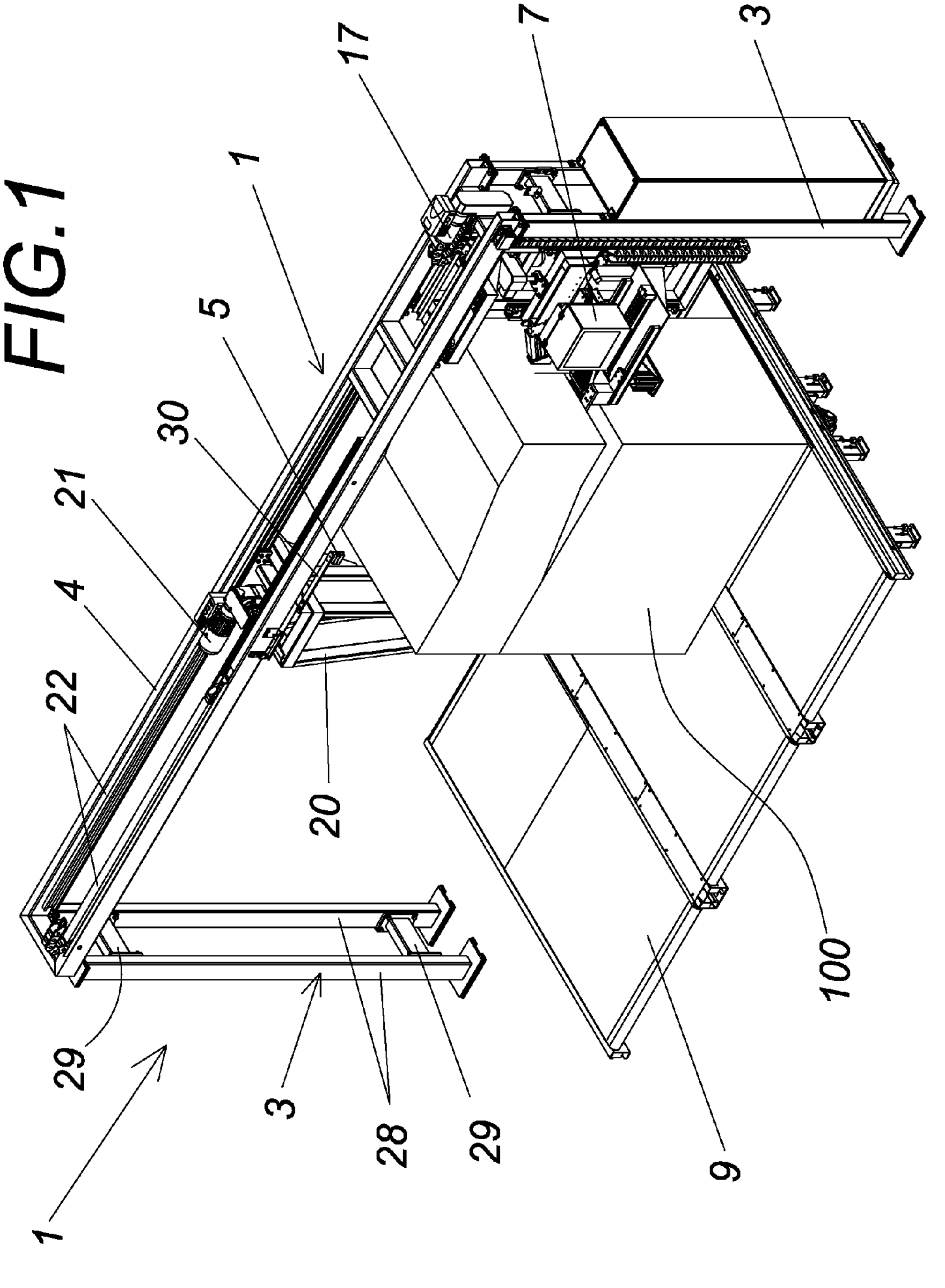
FIG. 1 is a perspective view of a labelling machine according to the present invention.
Figure 2:
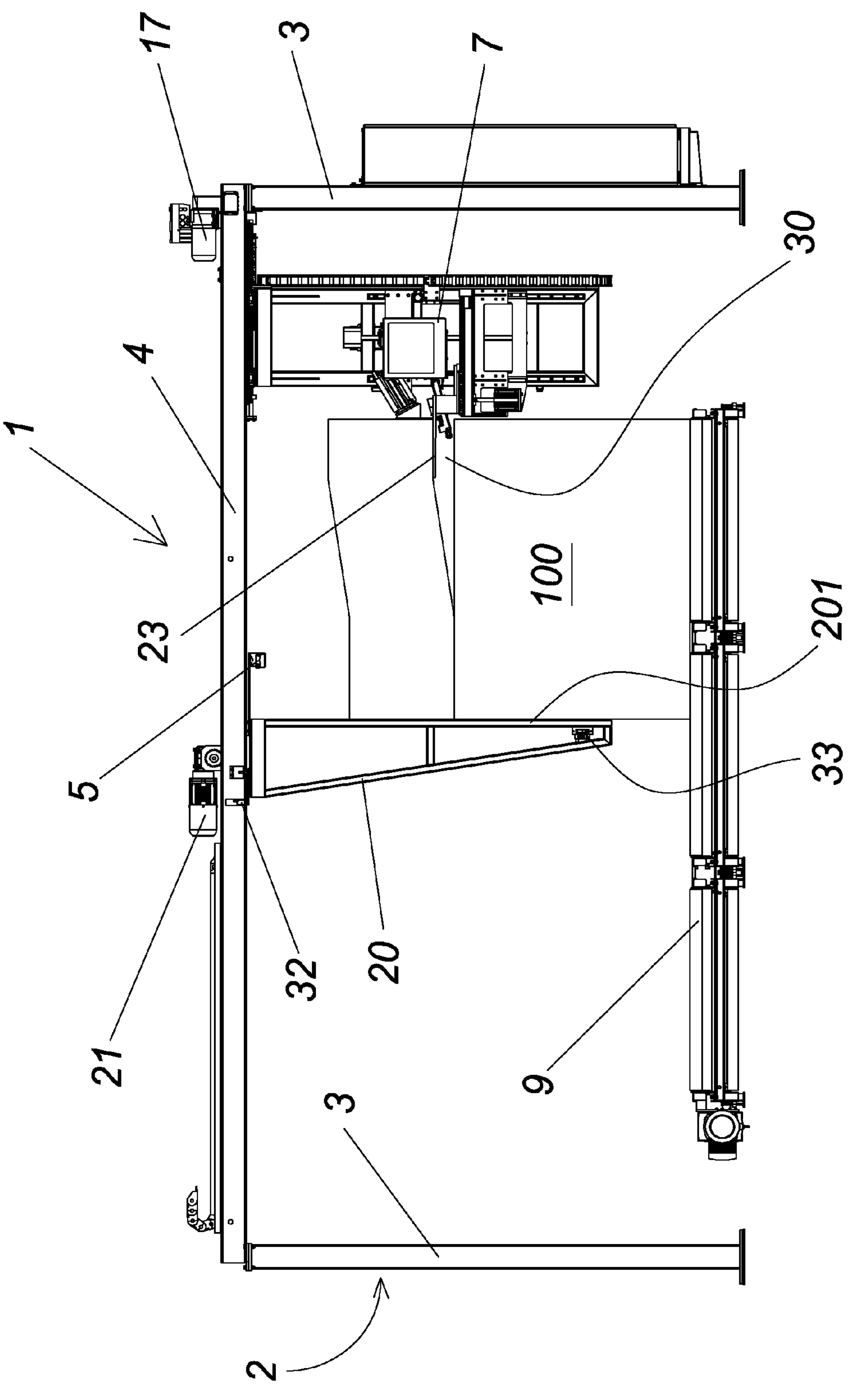
FIG. 2 is an elevational view of the labelling machine.
Figure 3:
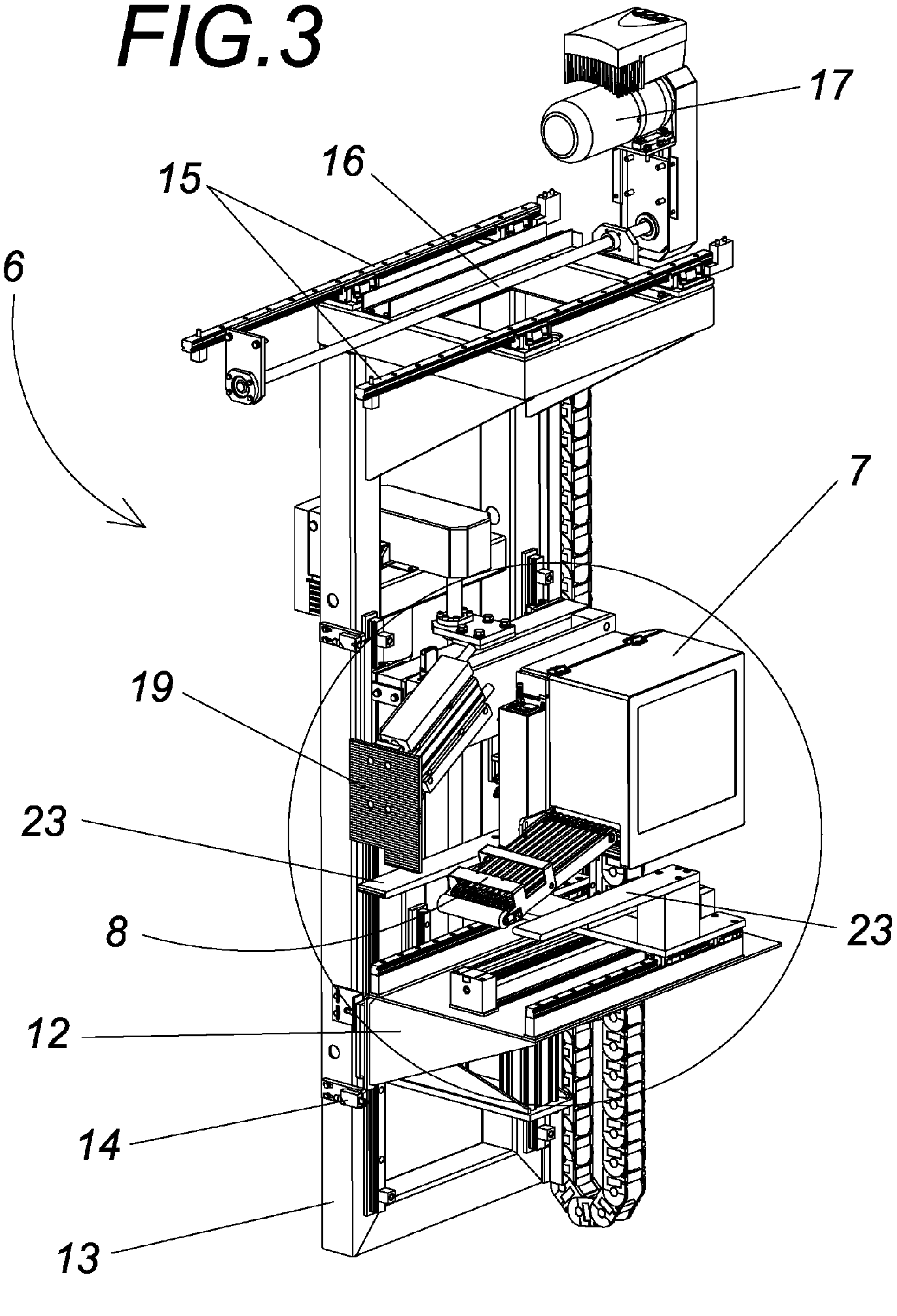
FIG. 3 is a perspective view of the head forming part of the labelling machine.

As shown in FIGS. 1 and 2, the gantry is essentially formed by two vertical segments (3) which can be fixed to the ground by conventional fixing means, and attached at the upper portion by a horizontal section (4). The vertical segments (3) comprise a pair of metallic vertical profiles (28) attached to one another by horizontal profiles (29).

There can be provided between the two vertical segments (3) of the support structure (2) a horizontally arranged conveyor belt (9) (which does not form part of the machine of the invention) on which the stack of laminar elements (100) is deposited to carry out labelling by means of the machine described herein.

Figure 4:
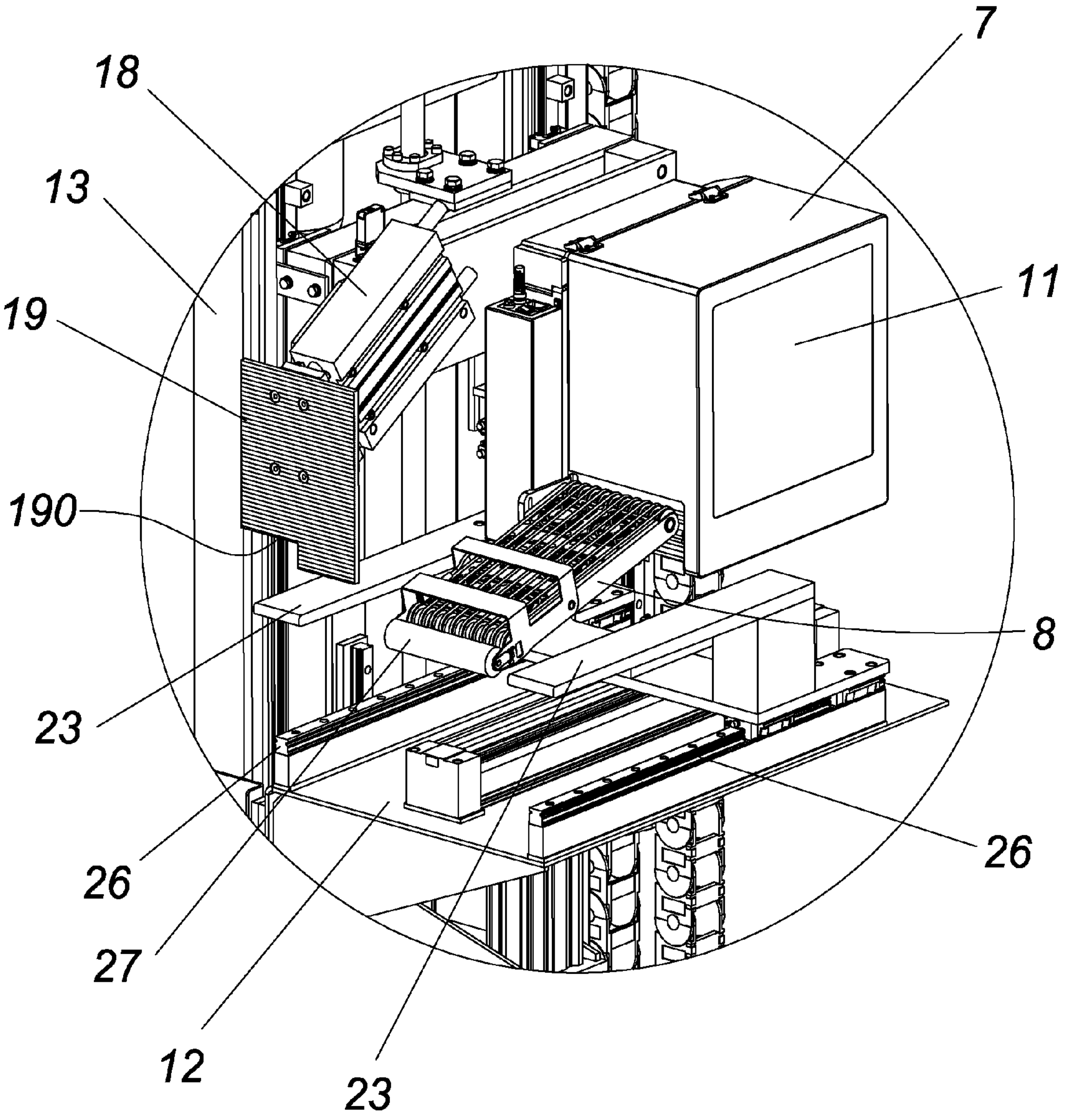
FIG. 4 is a detail view of a portion of the head depicted in FIG. 3.
Figure 5:
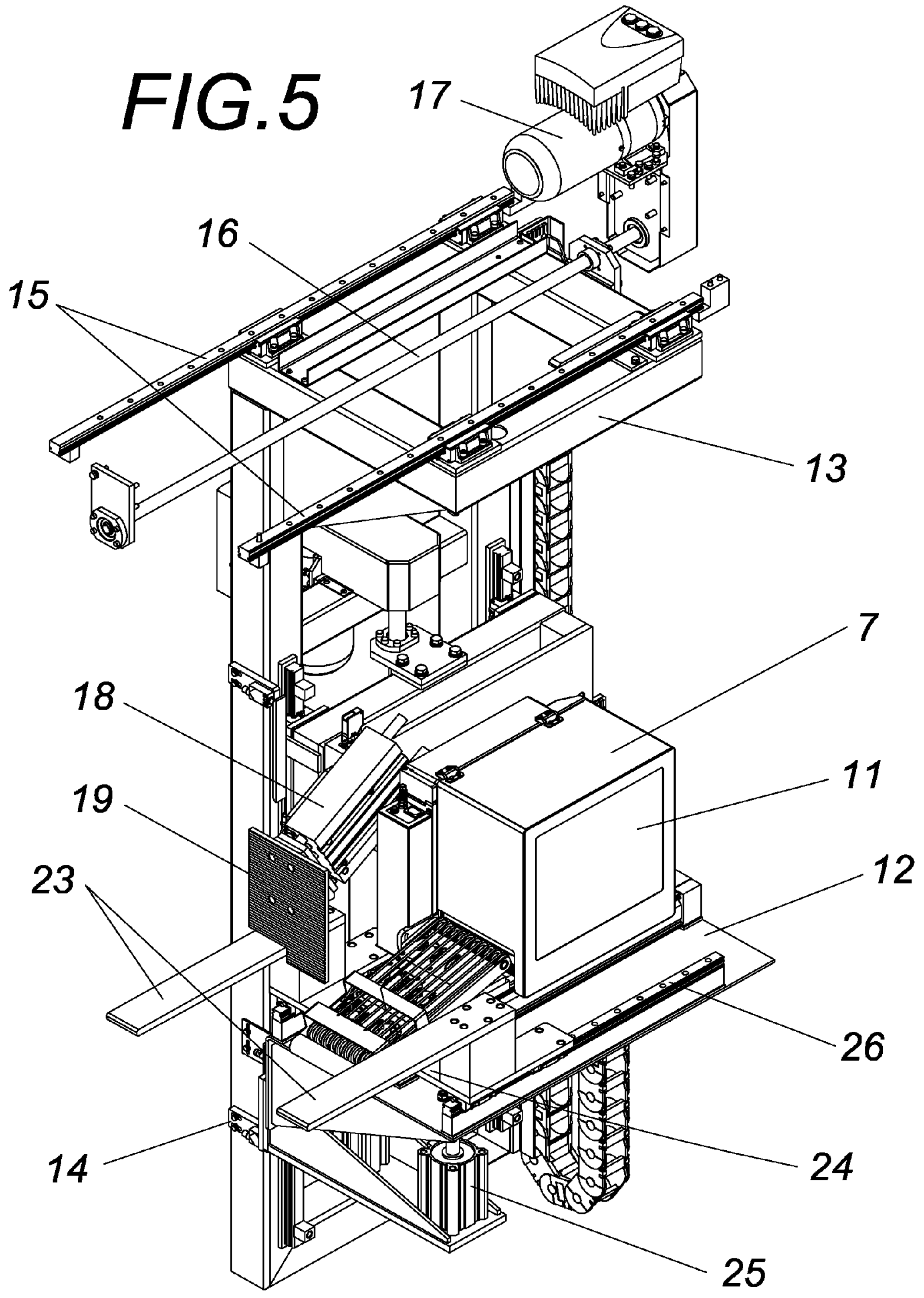
FIG. 5 is a perspective view of the head forming part of the labelling machine in a second operational position.
Figure 6:
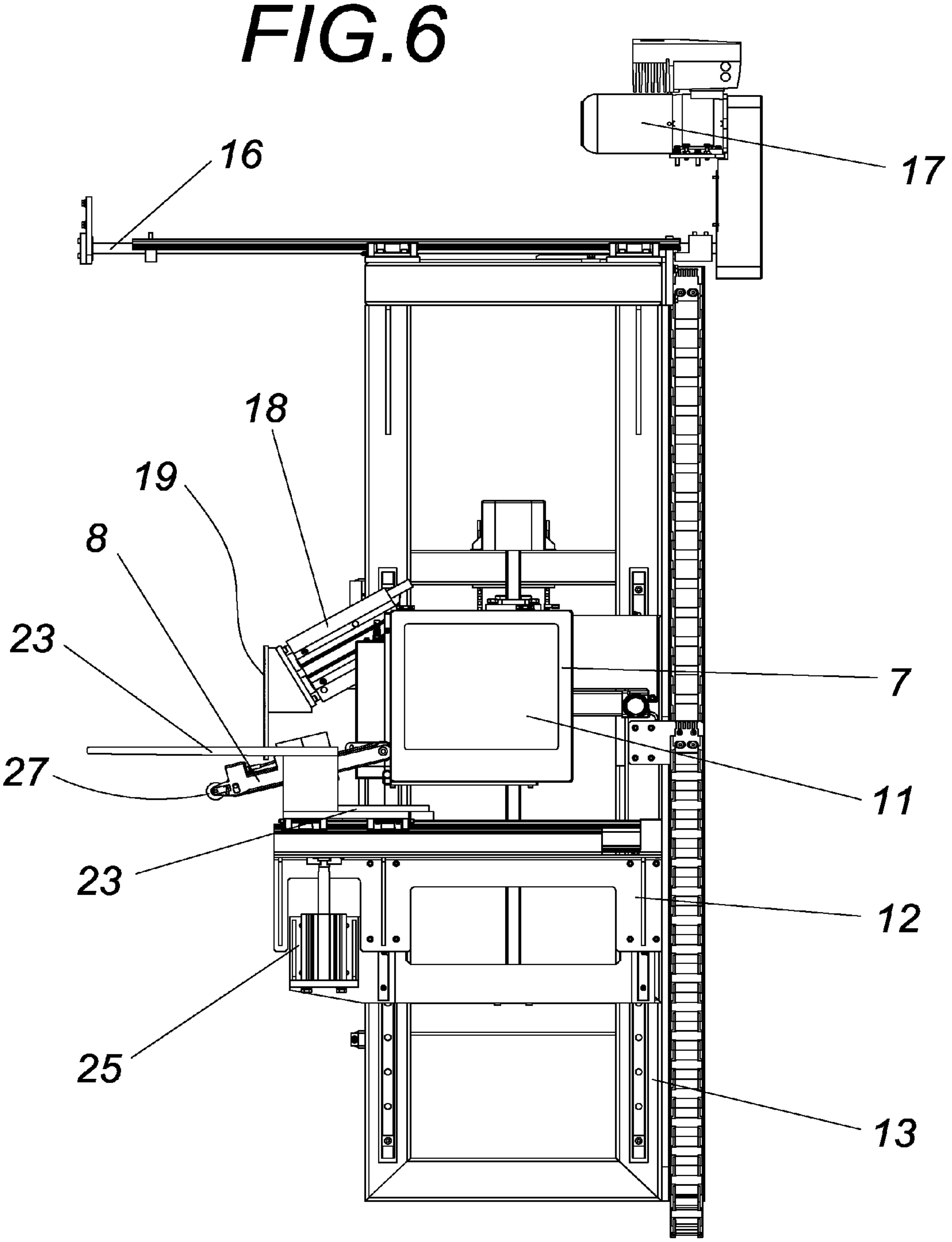
FIG. 6 is a side elevational view of the head.
Figure 7A:
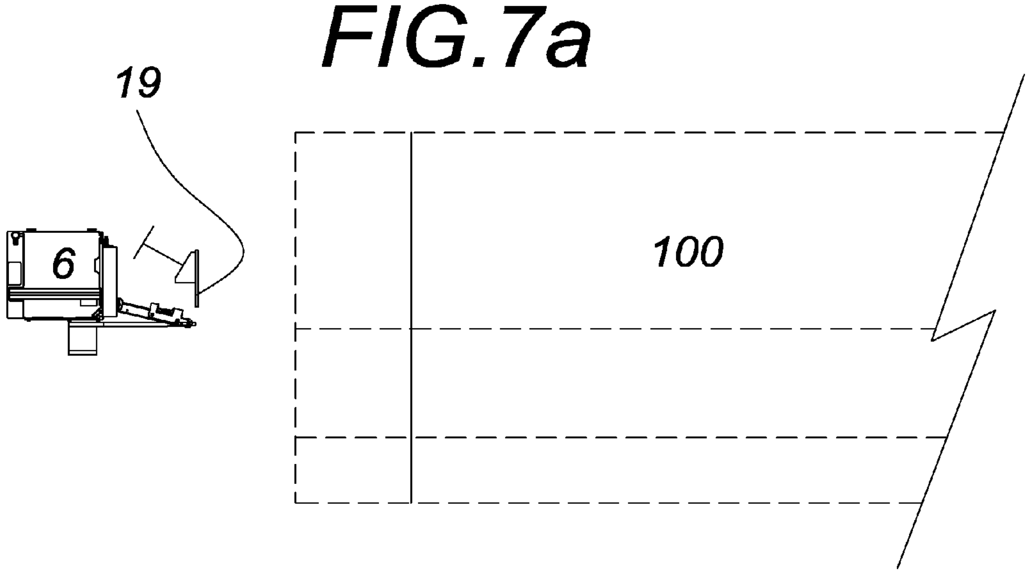
FIGS. 7*a-k* are sequential views depicting the different steps for operating the machine during the method for labelling a stack of sheets.
Figure 7B:
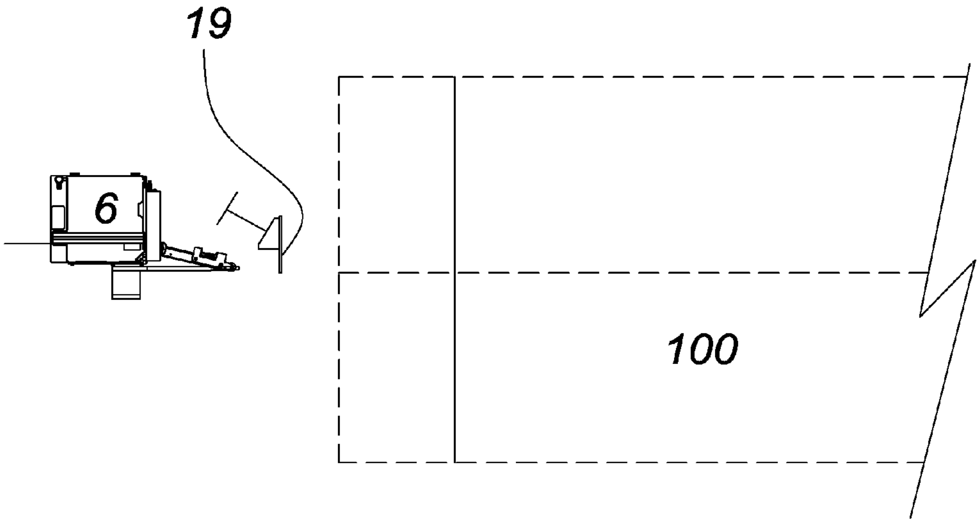
Figure 7C:
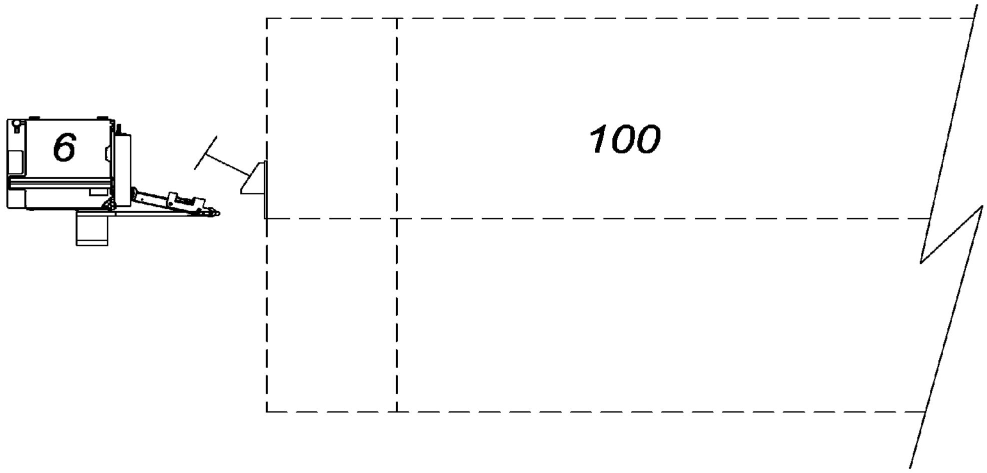
Figure 7D:
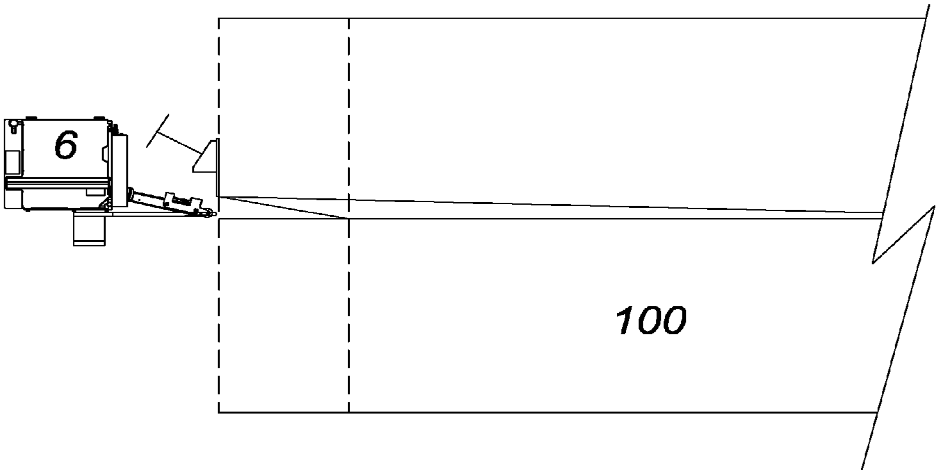
Figure 7E:
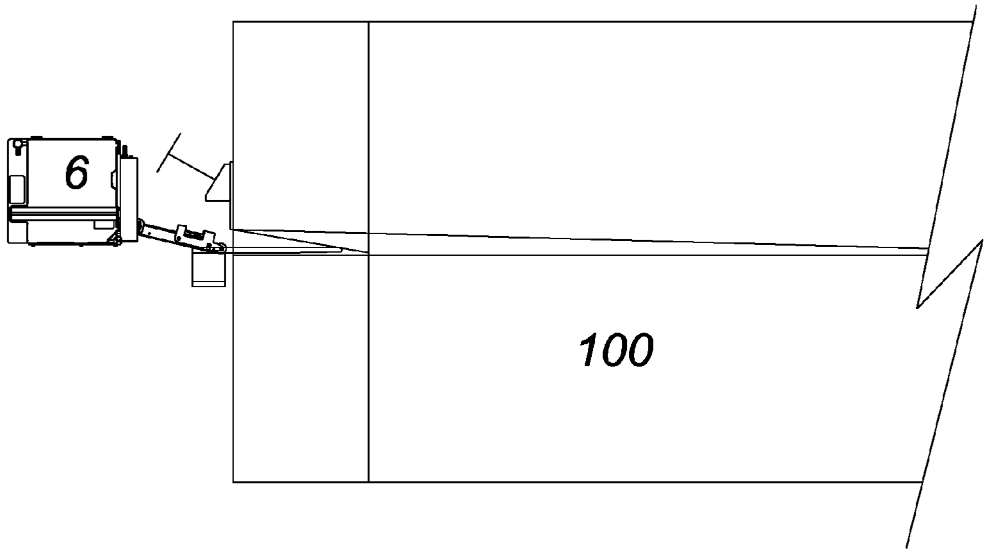
Figure 7F:
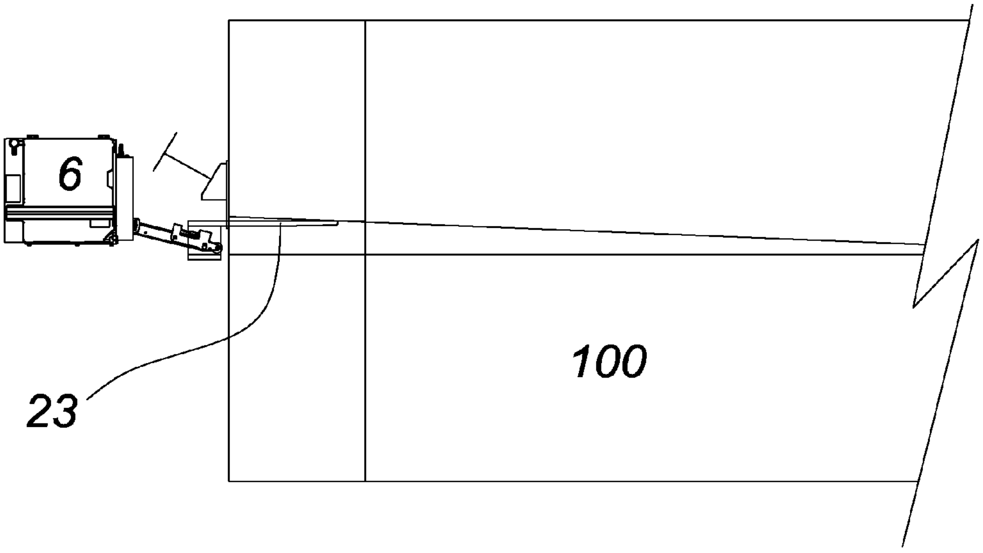
Figure 7G:
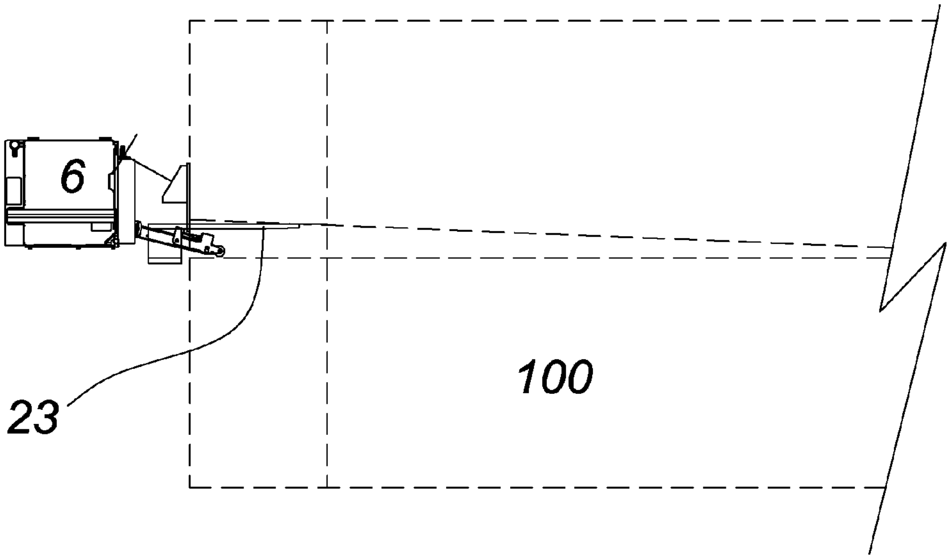
Figure 7H:
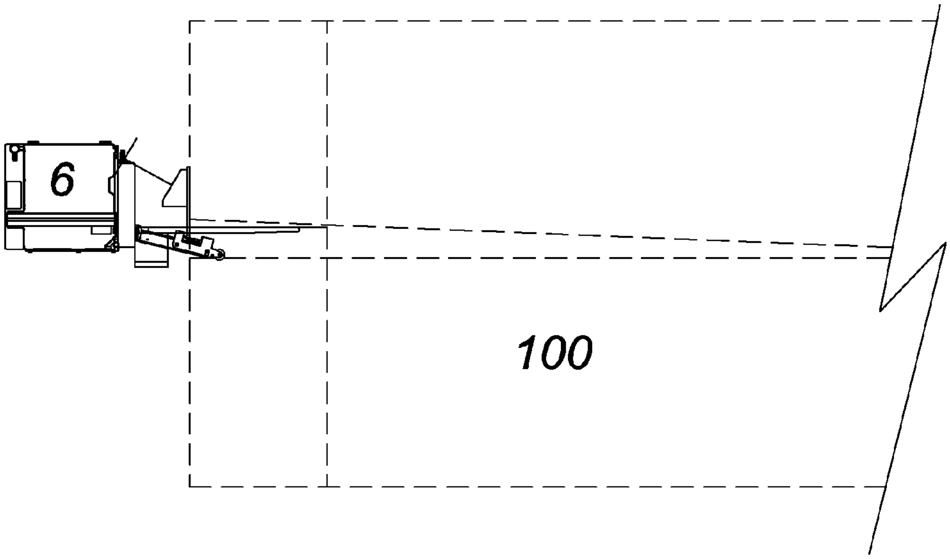
Figure 7I:
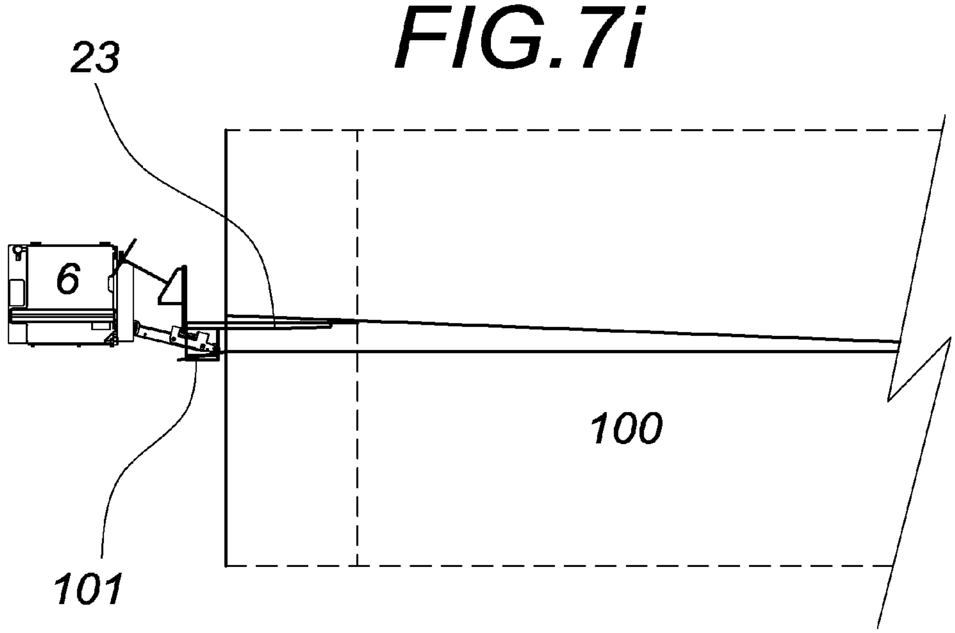
Figure 7J:
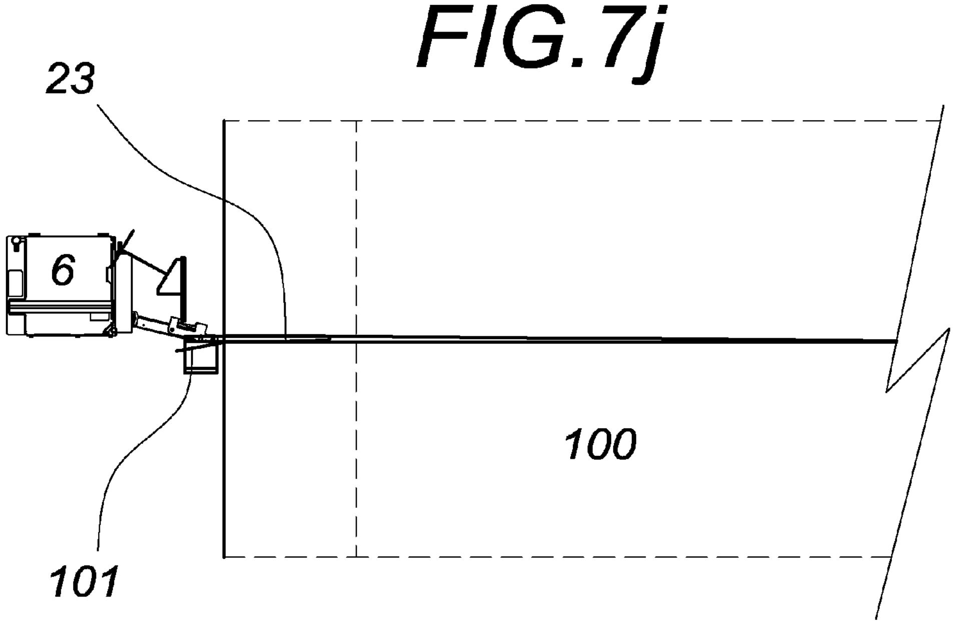
Figure 7K:
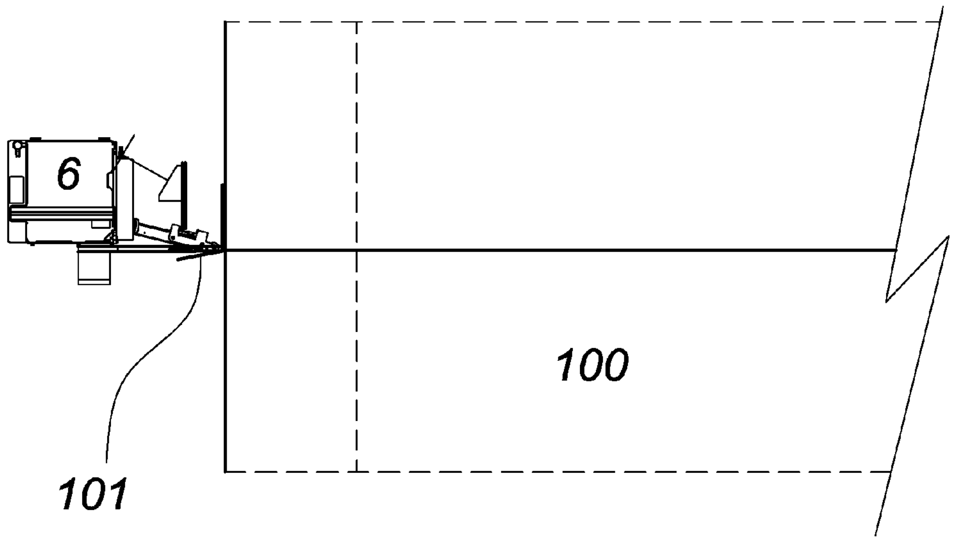

The head (6) supports printing means which are configured for printing a label to be placed on the stack of sheets, which comprise a printer (7) of the type that is commercially available so it will not be described in greater detail. In addition, a feeding ramp (8) is provided to facilitate the exit of the printed paper, which ramp is articulated at one end to the printer (see FIG. 4 for more detail), wherein the feeding ramp (8) is oriented towards the stack (100) and being inclined with respect to a horizontal plane or ground plane, which is intended for providing the printed label from the printer (7) to the stack of sheets (100). There is located at the end of the feeding ramp articulated thereto an idle roller (27) which will facilitate the folding of the printed label when it is placed on the stack of sheets (100), such that a segment of the label concealed between laminar elements adopts a horizontal position, whereas a second segment of the label adopts a vertical position, which is externally visible.

It should be mentioned that the printer has a screen (11) acting as an interface between the operator and the machine in order to allow adjusting operating parameters and data related to label printing.

The head (6), which is supported on the support structure (2), can move in a horizontal plane (forward and backward) through guiding means and a linear actuation actuated by the motorised means. The head also has other guiding means and linear actuation means actuated by motorised means (17) intended for adjusting the height of the head (6) itself. Additionally, there are some abutment means located in the head (6) intended to make contact with a stack of sheets (100).

The head (6) has a platform (12) assembled on a frame (13) of the head (6) movable by means of motor means, and also has sensor means, generally indicated with the reference (14), such as a photocell, intended for calculating the speed of movement in the horizontal plane, such that it allows controlling the speed of movement in order to prevent the speed of the head from damaging the stack of sheets (100) to be labelled.

In the upper portion of the head (6) there are arranged guiding means comprising a pair of rails (15) that run parallel to and spaced apart from one another, which can move through respective guides located in the horizontal segment (4). The head (6) is moved by means of motor means (17) located in the upper portion of the head (6).

Returning to the aforementioned abutment means which are located in the head (6), these abutment means comprise a pneumatic cylinder (18) which is arranged in an inclined plane with respect to the horizontal (or ground) plane, this pneumatic cylinder (18) being coupled at one end to an abutting platen (19) with a rectangular contour surface which is oriented in a vertical plane, being intended for abutting with the stack of sheets, as can be seen in FIGS. 1 and 2. It should be noted that the surface of the abutting flat (19) which is oriented facing a stack of elements has an embossed surface which makes it easier for the abutting platen (19) to grip the elements to be handled.

The support structure (2) includes secondary abutment means intended for making contact with a stack (100) which, in this example, are laminar elements or cardboard sheets.

In addition, separation means (described in greater detail below) intended for separating two laminar elements superimposed on one another forming part of the stack of sheets (100) are provided, such that they vertically separate a laminar element, generating a free space between the two laminated elements intended for the arrangement of the label.

Returning again to the secondary abutment means, the secondary abutment means comprise a movable column (20) with a vertical surface (201) intended for coming into contact with the stack of laminar elements, the movable column (20) being capable of sliding axially along a horizontal cross member of the gantry structure (2) through guiding means and with motor means (21) such as, for example, a geared motor, located in the upper portion of the movable column (20). This movable column (20) is constructed in such a way that it allows weight to be reduced, which implies a lower electrical consumption during the operation of the motor means (20). It should be mentioned that there is arranged in the lower portion of the movable column (20) a detection sensor (33) intended for stopping the movement of the movable column (20) when it comes into contact with the stack of elements (100).

As can be seen in FIG. 1, such guiding means comprise a pair of guides (22) present in a region of the horizontal segment (4) on which rolling means coupled to the movable column (20) slide. The actuation of the movable column (20) is carried out by means of a linear actuation system linked to the motor means (21) located in the horizontal segment (4) of the gantry.

In order to prevent the stack of sheets (100) from being able to be damaged due to a strong contact or impact with the head, the movable column (20) includes sensor means, generally indicated with the reference (5), such as, for example, a photocell, which are intended for detecting the speed and position of said movable column (20). The sensor means (5) are assembled at one end of a rod (30) securely coupled in the upper portion of the movable column (20) by means of screws.

It should also be mentioned that the horizontal segment (4) includes an end-of-travel sensor (32) connected to the control unit of the machine (1), which allows detecting the point of maximum movement to be performed by the movable column (20) when an area of the movable column (20) contacts said sensor (32).

Now, as regards the separation means, in this embodiment by way of example, the separation means comprise a pair of retractable parallel blades (23) arranged separated from one another by a distance acting simultaneously as they are assembled on a sliding plate (24), such that the blades (23) can move in a horizontal plane from a first retracted position to a second extended position in which such two blades (23) are introduced into a stack of sheets. These blades (23) can move through the arrangement of the sliding plate (24) which has linear guiding means and actuator means, such as a pneumatic cylinder (25), located in the lower portion of the platform (12).

The mentioned linear guiding means in turn comprise a pair of guides (26) on which the sliding plate (24) slides.

It should be mentioned that the abutting platen (19) has a stepped recess (190) on the lower edge which is intended for allowing the easy passage of a blade (23).

Next, and with particular reference to FIGS. 7*a-k* showing the various operating stages of part of the labelling machine, the method for labelling a stack by means of using the machine described above will be explained.

To perform the labelling operation on a stack of sheets (100), first, the movable column (20) is moved towards a stack of elements to be handled in order to move said stack towards the head (6). Once the stack has been moved a predetermined distance, the abutting platen (19) is moved closer to come into contact with one side of the stack.

Next, two elements which are superimposed on one another are separated by deploying the separation means described above in a horizontal movement to maintain the separating free space. Subsequently, the printer (7) is moved closer to the stack of laminar elements (100) to insert the printed label, as described below, into the free space (30) existing between two laminar elements.

The printed label (101) circulates through the feeding ramp (8) associated with the printer such that it is partially placed between the two laminar elements, such that once said printed label (101) is deposited, the blades (23) move down vertically and then move back horizontally to their retracted position. The printed label (101) is arranged such that a segment of the label is inserted and concealed between two laminar elements and a second segment of the label is oriented in a vertical plane that facilitates its visibility.

It is should be mentioned that, in order to facilitate the placement of the label between two sheets of the stack of sheets (100), the printed label (101) exits the printing means in printed form towards one side of the stack of sheets (100) in an inclined plane with respect to the horizontal plane, as a result of the arrangement of the feeding ramp (8). As a result of the height adjustment of the position of the printer (7), the printed label (101) can advantageously be placed on stacks of sheets of any height.

The details, shapes, dimensions and other complementary elements used in the manufacturing the labelling machine of the invention may be suitably replaced with others that do not depart from the scope defined by the claims below.

The invention claimed is:

1. A labelling machine for labelling a stack of elements for placing a label located between elements, the labelling machine comprising:

a support structure;

a printing means configured for printing a label to be placed on a stack of elements;

a head supported on the support structure, the head being provided with the printing means, the head being movable and adjustable at least in height through guiding means and motorised means; and a separation means intended for separating two elements superimposed on one another forming part of the stack, such that they vertically separate an element to be handled, generating a free space between the two elements intended for the arrangement of the label, wherein abutment means are provided located in the head intended for making contact with a stack of elements to be handled and preventing the movement of the stack of elements during the placement of the printed label, the abutment means located in the head comprising a pneumatic cylinder located in an inclined plane with respect to a horizontal plane, the pneumatic cylinder being coupled to an abutting platen provided with a surface oriented in a vertical plane and intended for abutting with the stack of sheets, and wherein the separation means comprise at least one retractable blade, such that it is movable from a first retracted position to a second extended position in which said at least one blade is introduced into the stack of elements.

2. The labelling machine according to claim 1, wherein the support structure comprises a gantry provided with secondary abutment means intended for making contact with a stack of elements.

3. The labelling machine according to claim 2, wherein the secondary abutment means comprise a movable column with a vertical surface intended for coming into contact with the stack of elements, the movable column being capable of sliding axially along a horizontal cross member of the gantry structure.

4. The labelling machine according to claim 1, wherein the printing means comprise a printer and a printed paper feeding ramp oriented towards the stack of elements.

5. The labelling machine according to claim 4, wherein the feeding ramp is inclined with respect to a horizontal plane or ground plane.

6. The labelling machine according to claim 2, wherein the secondary abutment means include sensor means intended for detecting parameters related to the movement of said secondary abutment means along the support structure.

7. The labelling machine according to claim 1, wherein the abutting platen has a recess intended for the passage of the separation means during movement from the retracted position to the extended position and/or vice versa.

8. The labelling machine according to claim 1, wherein the separation means comprise at least one axially movable blade linked to actuator means, said at least one blade being assembled on a structure horizontally movable by means of linear guiding means present in the head.

9. The labelling machine according to claim 1, wherein it comprises an interface between a control unit intended for the operation of the machine and the operator.

10. The labelling machine according to claim 1, wherein the head has a platform assembled on a frame movable by means of motor means, which includes the guiding means forming part of the separation means and printing means.

11. The labelling machine according to claim 1, wherein the support structure includes guiding means for moving the head in a forward and backward movement direction in a horizontal plane.

12. The labelling machine according to claim 1, wherein the head includes sensor means intended for calculating the speed of movement in the horizontal plane.

13. The labelling machine according to claim 2, wherein the support structure includes end-of-travel means intended for detecting the point of maximum movement of the secondary abutment means.

14. A method for labelling a stack of elements to be handled, using a labelling machine, the labelling machine comprising a support structure;

a printing means configured for printing a label to be placed on a stack of elements;

a head supported on the support structure, the head being provided with the printing means, the head being movable and adjustable at least in height through guiding means and motorised means; and a separation means intended for separating two elements superimposed on one another forming part of the stack, such that they vertically separate an element to be handled, generating a free space between the two elements intended for the arrangement of the label, wherein abutment means are provided located in the head intended for making contact with a stack of elements to be handled and preventing the movement of the stack of elements during the placement of the printed label, the abutment means located in the head comprising a pneumatic cylinder located in an inclined plane with respect to a horizontal plane, the pneumatic cylinder being coupled to an abutting platen provided with a surface oriented in a vertical plane and intended for abutting with the stack of sheets, and wherein the separation means comprise at least one retractable blade, such that it is movable from a first retracted position to a second extended position in which said at least one blade is introduced into the stack of elements;

wherein the method comprises the execution of labelling on a stack of elements to be handled is carried out by the steps of:

moving the abutting platen closer so as to come into contact with one side of the stack;

separating two elements which are superimposed on one another, such that they define a space between both two elements;

deploying the separation means in a forward movement direction in a horizontal movement;

printing a label using the printing means, such that the printed label is partially inserted into the space existing between the two separated elements; and retracting the separation means in a backward movement direction to its standby position.

15. The method for labelling according to claim 14, wherein the label exits the printing means in printed form towards the stack of elements to be handled in an inclined plane with respect to a horizontal plane.

16. The method for labelling according to claim 14, wherein once the label is placed on the stack of elements to be handled, upon retracting the printing means, the label adopts an arrangement such that a segment of the label is concealed between elements adopting a horizontal position, whereas a second segment of the label adopts a vertical position that is externally visible.

* * * * *